United States Patent
Wu et al.

(10) Patent No.: US 11,669,951 B1
(45) Date of Patent: Jun. 6, 2023

(54) SYSTEM FOR SELECTING CONTENT FOR A PERSONALIZED VIDEO REEL

(71) Applicant: Meta Platforms, Inc., Menlo Park, CA (US)

(72) Inventors: Haotian Wu, New York, NY (US); Erin Kumari Pettigrew, San Francisco, CA (US); Adam Feldman, New York, NY (US); Zhengyu Su, Brooklyn, NY (US); Chengyan Qi, San Francisco, CA (US); Joaquim Castella, Brooklyn, NY (US)

(73) Assignee: Meta Platforms, Inc., Menlo Park, CA (US)

( * ) Notice: Subject to any disclaimer, the term of this patent is extended or adjusted under 35 U.S.C. 154(b) by 0 days.

(21) Appl. No.: 17/247,386

(22) Filed: Dec. 9, 2020

Related U.S. Application Data

(60) Provisional application No. 63/033,095, filed on Jun. 1, 2020.

(51) Int. Cl.
*G06Q 50/00* (2012.01)
*G06T 7/00* (2017.01)
*G06F 3/04817* (2022.01)
*G06V 20/40* (2022.01)

(52) U.S. Cl.
CPC ........ *G06T 7/0002* (2013.01); *G06F 3/04817* (2013.01); *G06Q 50/01* (2013.01); *G06V 20/41* (2022.01); *G06V 20/46* (2022.01); *G06T 2207/10016* (2013.01); *G06T 2207/20081* (2013.01); *G06T 2207/30168* (2013.01)

(58) Field of Classification Search
CPC .......... G06Q 50/01; G06T 2207/10016; G06T 2207/20081; G06T 2207/30168; G06T 7/0002; G06V 20/41; G06V 20/46; G06F 3/04817
See application file for complete search history.

(56) References Cited

U.S. PATENT DOCUMENTS

| | | | |
|---|---|---|---|
| 8,706,655 B1* | 4/2014 | Rangarajan | G06Q 30/0282 706/12 |
| 9,372,589 B2* | 6/2016 | Rahle | G06F 3/0482 |
| 9,928,556 B2* | 3/2018 | Owens | G06Q 50/01 |
| 10,387,513 B2* | 8/2019 | Royzner | G06N 5/04 |
| 10,394,420 B2* | 8/2019 | Esinovskaya | G06F 16/93 |
| 10,430,481 B2* | 10/2019 | Tikhonov | G06F 16/9536 |
| 10,897,649 B1* | 1/2021 | Germano | G06N 20/00 |
| 11,170,006 B2* | 11/2021 | Sernau | G06Q 30/0282 |
| 11,216,506 B1* | 1/2022 | Ranzinger | G06F 16/54 |
| 2017/0090703 A1* | 3/2017 | Iskandarov | G06F 3/0485 |
| 2018/0211333 A1* | 7/2018 | Lackman | G06N 20/00 |

* cited by examiner

*Primary Examiner* — Alvin H Tan
(74) *Attorney, Agent, or Firm* — Lee & Hayes, P.C.

(57) ABSTRACT

Techniques are described that enable and assist a social networking system in curating user generated content for publication without relying on a popularity or following of a creator of the content. In some cases, the social networking system may receive a content item generated by a user and determine one or more content centric metrics associated with the content item. The social networking system may then select content items for publication based on the associated content centric metrics.

19 Claims, 7 Drawing Sheets

SYSTEM FOR SELECTING CONTENT FOR A PERSONALIZED VIDEO REEL

CROSS-REFERENCE TO RELATED APPLICATION(S)

This application claims priority to U.S. Provisional Application No. 63/033,095, filed on Jun. 1, 2020 and entitled "SYSTEM FOR SELECTING QUALITY CONTENT" the entirety of which is incorporated herein by reference.

BACKGROUND

Social networking systems receive large amounts of content from various sources on a regular basis. Typically, the social networking systems curate or select content to present to individual users in large part based on a popularity of the content item itself or the popularity of the individual posting the content to the social networking system. However, selecting popular content or content from popular users, often disfavors and prevents content generated by different users from reaching larger audiences regardless of the quality, value, or workmanship of the content item.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
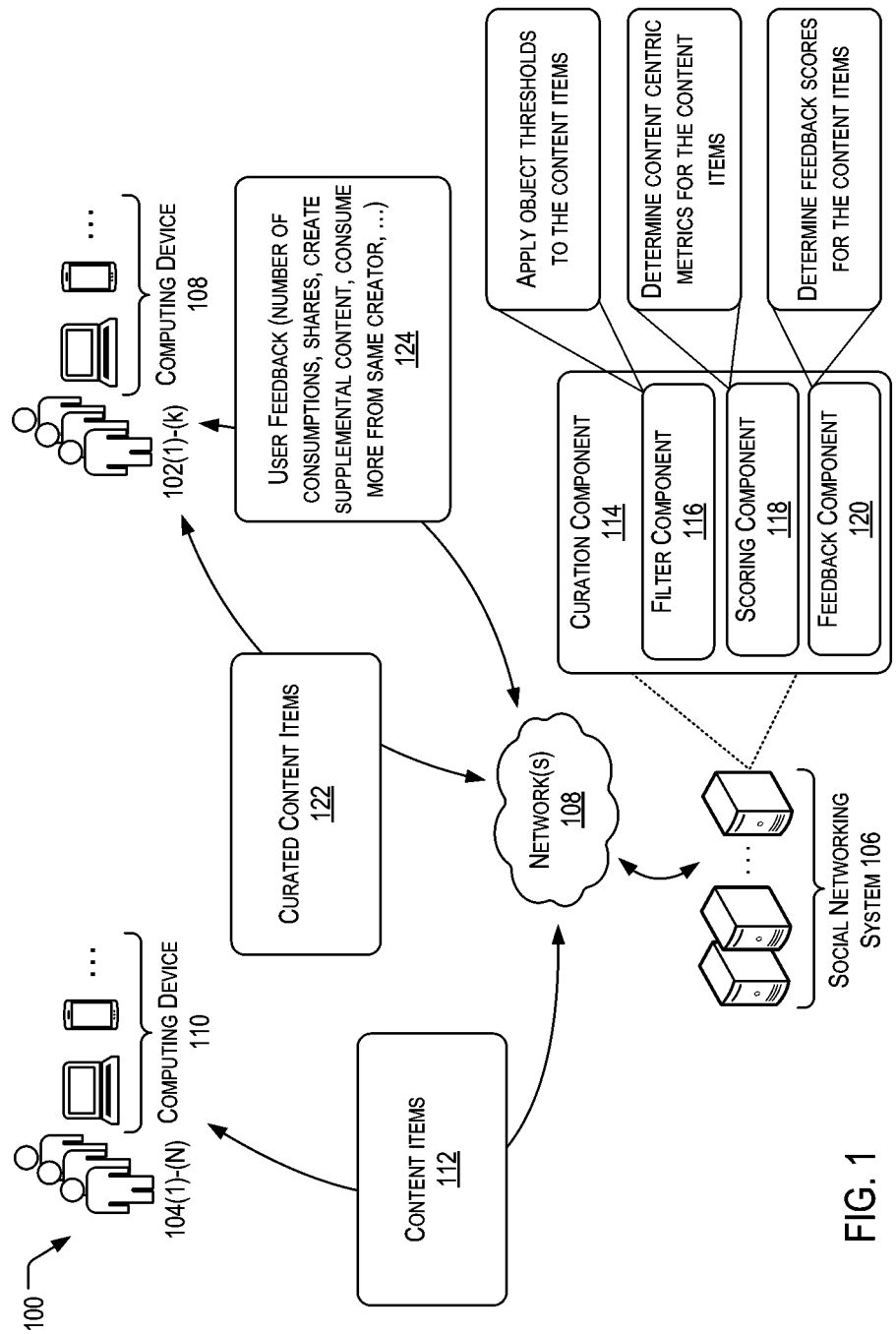
FIG. 1 is a view of an example system usable to curate content items for users independent of the popularity of the content item or the creator, according to some implementations.

As discussed above, social networking systems continue to develop fun and unique ways for creators to generate and share content with large audiences, even when the creators may be a great distance from their audiences. In many cases, creators may generate high quality and high value audio, video, and/or other content to share, but may not have a current fan base or following waiting and ready to consume the content. Additionally, in some cases, users of a social networking system may be looking for high-quality content creators that the users have not previously discovered, but may have difficulty reaching high-quality content creators when presentation of content items is based on popularity of a content creator, rather than quality of the content item.

This application describes techniques for social networks to curate relevant, high quality, and/or high value content created by individual users or creators that are either new to social networks or lack a current fan base or following, where the content is curated based on content centric metrics (e.g., metrics that relate to objective criteria of the content itself, such as video quality, jitter, audio quality, position of a speaker within the video content, and the like). For example, the social networking system may be configured to evaluate, select, and present the content based on the quality, relevance, and value of each individual content item opposed to a popularity of the creator or even the content item itself. For instance, the social networking system may determine a audio/video quality of the content item, such as based on audio clarity, video clarity, lighting, video resolution, video stability (e.g., was the image capture device stable when the content was captured), amount of editing or special effects, and the like. In some cases, the social networking system may also determine other objective aspects of the content, such as whether the speaker was centered in the video, whether the speaker was looking at the camera capturing the video, whether the background was free of distractions (e.g., a child running through the background), and the like. Content items that are recorded with higher level audio and video quality are more likely to be quality content and more likely to be enjoyed by the consuming users.

The social networking system may also determine a narrative quality of the content. For example, the social networking system may determine if the content has or includes a consistent theme or style (e.g., consistent voices, art work, backgrounds, and the like), a plot, a setting, a conflict or problem, twist (e.g., is there a surprise), and/or a resolution (e.g., a solution to the conflict or problem). The social networking system may also determine a complexity of the content, such as a reading level or education level for the content. The complexity may also be based on if the content item is a standalone work or requires supplemental content to understand (e.g., does the consuming user need additional information related to the creator or other content to fully understand the content item at hand).

The social networking system may also determine an emotional quality of the content. For example, the social networking system may determine how likely the content item is to delight or scare the consuming user. For example, the social networking system may determine how likely the content is to cause the consuming user to laugh, smile, scream, etc.

In some implementations, the social networking system may first apply one or more filters to the content item to eliminate or remove or assign a lower score to any content items having various quantifiable or objective defects. For example, the filters may include a resolution or pixel count filter, a lighting quality filter, an audio quality filter, a background noise filter, and the like. In this implementation, each filter may act as a minimum threshold or barrier for the content item to be pushed or provided to the consuming users.

If a content item exceeds or meets the minimum threshold applied by the filters, then the content item may be evaluated based on a more qualitative review using various machine learned classifiers and networks as well as, in some cases, undergo an external or third party review (such as an editor to review narrative or creative aspects of the content item). For instance, the social networking system may determine the content centric metrics using various machine learned models, human ratings, similarity comparisons, and the like. In some examples, the social networking system may include various extraction components, such as translational components and/or optical character recognition components, to parse and extract a portion of the content items. In this instance, the social networking system may process or analyze both the larger content item as a whole and the individual extracted portions. For example, the translational component may extract parts of speech and sentences from the content item, differentiate between music, background noise, and voices, differentiate between different speakers, and the like. The optical character recognition components may be configured to extract text, organize text, and the like.

The social networking system may apply one or more classifiers to each of the extracted components. For example, the social networking system may utilize one or more audio classifiers, one or more video/image classifiers, and one or more text classifiers to determine features, events, user responses, and/or characters of portions of the content item. In various implementations, each classifier may include or implement a trained machine learned model to determine specific features. For example, a video/image classifier may be used to classify each character of the content item and/or a text classifier may be used to determine a punchline of the content item. In some cases, the classified features, events, user responses, and/or characters may be further used as input to various additional machine learned models to determine the content centric metrics of the content item.

In some implementations, once the content centric metrics are determined for the content item contents, the content items may be ranked using one or more of the content centric metrics. In some cases, the content centric metrics may be summed and the content items with the highest sum of content centric metrics may be selected. In various examples, the social networking system may select one or more of the content centric metrics to use to rank the content items for a particular consuming user. For instance, the social networking system may utilize user information known about the user whose account or instance is being seeded to select which of the content centric metrics may be used to rank the content items. As one illustrative example, a consuming user may enjoy content that makes the user laugh and so the social networking system may utilize a content centric metric associated with likelihood to cause laughter as the content centric metric for ranking the content items.

In some examples, the social networking system may also utilize a group of content curators selected to view content items generated by users lacking a large following. In some cases, the input provided by the content curators may be used in addition to the content centric metrics to select content to provide additional users of the social network. Alternatively or additionally, the content items selected by the content curators may be used as an input to train machine learned models that generate and/or evaluate the content centric metrics prior to publication of each content item, as discussed above.

In some particular implementations, the social networking system may also utilize a test user set or group in order to receive initial feedback on the content items prior to ranking. For example, the test user set or group may provide feedback in the form of number of views by each user (e.g., how many times was a content items viewed or re-watched by a test user), number of shares by a test user, was any supplemental content created (related content items, comments, and the like), was other content of the creator consumed by the test users after the content item, among others. This additional feedback may be used as an input to the machine learned models and classifiers discussed above or to one or more additional machine learned models to generate additional content centric metrics (e.g., feedback scores) that may be used in ranking the content for the general users of the social network.

In some cases, the social networking system may employ multiple series or sets of users to filter or select curated content for the general user audience. For example, the social networking system may select a set of curated content items as discussed above. The set of curated content items may be provided to a first set of users. The social networking system may receive feedback from the first set of users, in the form of consumption metrics, comments, tagging, sharing, and the like. Based on the feedback, the social networking system may select a subset of the curated content items (e.g., the top 1, 5, 10, etc. curated content items and/or curated content items meeting or exceeding a feedback criteria).

The subset of curated content items may then be grouped into a second set of curated content items together with other top performing curated content items (e.g., curated content items associated with other sets of curated content items provided to other initial users). The second set of curated content items (e.g., the group of top performing curated content items from two or more sets of curated content items) may then be published to a second set of users. The second set of users may be larger than the first set of users. The social networking system may then repeat the process discussed above to generate a third set of curated content items including the top performing content items of the second set of curated content items and top performing content items from other sets of curated content items. In this manner, on each iteration, content items that are well received by the selected users may continue to be published to larger and larger user bases, exposing the content created to a large audience regardless of the content creator's status with the social networking system.

In some cases, the social networking system may also eliminate candidate content items from consideration as a candidate content item for publication. For example, if the social networking system determines that a candidate content item includes dangerous content, violent content, or otherwise inappropriate content, the social networking system may eliminate the candidate from consideration. In some cases, the social networking system may also eliminate a candidate content item when the author or creator has had a history of inappropriate content or the like. In some cases, the social networking system may eliminate a candidate content item if the account has been active on the social networking system for less than a predetermined number of days (such as 30 days) so that the social networking system can determine a validity of the creator prior to selecting the creators content for the curation process.

FIG. 1 is a view of an example system 100 usable to curate content items for consuming users 102(1)-(k) independent of the popularity of the content item or the creator 104(1)-(n), according to some implementations. In some examples, the consuming users 102(1)-(k) and the creators 104(1)-(n) (collectively "users") interact with a social networking system 106 using various types of computing devices, respectively indicated by 108 and 110.

In the illustrated example, creators 104 may generate content items 112 for publication via the social networking system 106. The content items 112 may be of various quality, value, and/or interest to the consuming users 102. As discussed above, conventional social networking systems may curate the content based on a popularity of the creator and/or the content item itself. However, by utilizing popularity as a metric for presentation requires the creator to have a large following or fan base in order for the creator's content items to be widely published or viewed, thus reducing a potential audience for the creator's content items. In some cases, this may discourage or prevent up-and-coming creators 104 from utilizing a particular social networking system as an outlet for their creative content. Thus, the social networking system 106, discussed herein, may curate content items 112 based on content centric metrics associated with the individual content items 112 themselves rather than a popularity of the creator.

For instance, as illustrated, the social networking system 106 may include a curation component 114. The curation component 114 may itself include a filter component 116, a scoring component 118, and a feedback component 120. The filter component 116 may be configured to apply one or more quantitative and/or objective thresholds to the content items 112. For example, the filter component 116 may apply one or more thresholds based on an objective or quantitative metric to each content item and each content item that fails to meet or exceed the threshold may be eliminated as a publication candidate. In some cases, the threshold may include audio quality thresholds, such as background noise below a predetermined decibel level, an image or video quality resolution above a predetermined resolution threshold, image or video quality frame rate above a predetermined frame rate threshold, an image or video quality below a predetermined jitter threshold, and the like.

The scoring component 118 may be configured to apply one or more classifiers or machine learned models to the content item. For example, the social networking system may utilize one or more audio, video/image, and text classifiers or machine learned models to determine features, events, user responses, and/or characters of portions of the content item. In various implementations, each classifier or machine learned model may be trained to determine specific features and to generate the content centric metrics for the content item based on the determined features.

In one specific example, the scoring component 118 may also evaluate the candidate content item to determine metrics associated with each candidate content item. For instance, the scoring component 118 may detect if the candidate content item includes an engagement request that requests users' feedback and/or the creation of supplemental content (such as the content item includes a challenge for a viewer to post supplemental content) and the like. Based on a determination that the candidate content item includes an engagement request, the scoring component 118 may score the candidate content item higher than other content items without the engagement request. In yet another example, the scoring component 118 may also evaluate how often the creator's content causes the generation of supplemental content. For example, if a creator is more likely to generate supplemental or additional content when a content item reaches a threshold audience level, that creator's content item may be selected by the scoring component 118 over content created by other user accounts. For example, if the creator has a history of recording supplemental content when a particular content item is viewed by more than a threshold number of users (e.g., 100 users, 1000 users, etc.), the scoring component 118 may select the creators content item for increased publication.

The feedback component 120 may be configured to output curated content items 122 to, for instance, a set of test users and to monitor user feedback 124 associated with the curated content items 122. For example, the user feedback 124 may take the form of a number of times a user watches or consumes a content item, a number of times a content item is shared, amount or number of supplemental content posted in response to a content item, amount of additional content a user consumes from a creator in response to viewing a content item, and the like. In some cases, the feedback component 120 may generate one or more feedback scores which may be used to rank or curate the content items 112 in addition to the content centric metrics output by the scoring component 118.

In some cases, the curation component 114 may then rank or otherwise select content items 112 to be published to the general users 102 as curated content items 122. For example, the curation component 114 may rank the content items 112 by summing content centric metrics and/or feedback scores and selecting the highest summed content centric metrics and/or feedback scores as the curated content items 122. In various examples, the curation component 114 may select one or more of the content centric metrics to use to rank the content items for a particular consuming user 102. For instance, the curation component 114 may utilize user information known about the user 102 whose reel is being seeded to select which of the content centric metrics may be used to select the curated content items 122, as discussed above.

In some examples, the selected or curated content items 122 may be used to populate an explore page of the social networking system 106 being viewed by one or more of the users 102(1)-(k). In some cases, the explore page may include icons or thumbnails associated with a plurality of the selected content items 122 such that the users 102 may quickly scan and select content for consumption from the explore page. In some cases, the position or placement of a curated content item 122 within the explore page may be based on the ranking of the corresponding content centric metrics. For example, the top-ranking content item may be placed near the top of the page, such that the user 102 does not have to scroll to see the icon associated with the top-ranking content item. In other examples, the higher-ranking content items may be positioned more central within the explore page or more in-line with a known field of view of the users 102 when browsing the explore page.

In some examples, the explore page may include one or more reels of curated content items 122. The reels may be a vertical or horizontal line of icons, each of which represents a single content item. The users 102 may be able to scroll or slide the reel-and-forth or up-and-down independent of other reels on the explore page. In this manner, the social networking system 106 may be able to present different reels of curated content items 122 ranked based on different combinations of metrics. In some cases, the curated content items 122 may be mixed or otherwise included in reels that also contain content items selected based on the creator's popularity and/or the popularity of the content items itself. In this manner, the users 102 may be exposed to popular creators, popular content, and curated content items 122 in a seamless experience.

In some examples, the social networking system 106 may provide privacy features to the users 102 and/or 104 while interacting with the social networking system 106. In particular examples, one or more objects (e.g., content or other types of objects) of the computing system 100 may be associated with one or more privacy settings. The one or more objects may be stored on or otherwise associated with any suitable computing system or application, such as, for example, the social networking system 106, a client system, a third-party system, a social networking application, a messaging application, a photo-sharing application, or any other suitable computing system or application. Although the examples discussed herein are in the context of an online social network, these privacy settings may be applied to any other suitable computing system. Privacy settings (or "access settings") for an object or item of content may be stored in any suitable manner, such as, for example, in association with the object, in an index on an authorization server, in another suitable manner, or any suitable combination thereof. A privacy setting for an object may specify how the object (or particular information associated with the object) can be accessed, stored, or otherwise used (e.g., viewed, shared, modified, copied, executed, surfaced, or identified) within the online social network. When privacy settings for an object allow a particular user or other entity to access that object, the object may be described as being "visible" with respect to that user or other entity. As an example and not by way of limitation, a user of the online social networking system may specify privacy settings for a user-profile page that identify a set of users that may access work-experience information on the user-profile page, thus excluding other users from accessing that information.

In particular examples, privacy settings for an object may specify a "blocked list" and/or a "restricted list" of users or other entities that should not be allowed to access certain information associated with the object. In particular examples, the blocked list may include third-party entities. The blocked list or restricted list may specify one or more users or entities for which an object is not visible. As an example and not by way of limitation, a user may specify a set of users who may not access photo albums associated with the user, thus excluding those users from accessing the photo albums (while also possibly allowing certain users not within the specified set of users to access the photo albums). In particular examples, privacy settings may be associated with particular social-graph elements. Privacy settings of a social-graph element, such as a node or an edge, may specify how the social-graph element, information associated with the social-graph element, or objects associated with the social-graph element can be accessed using the online social network. As an example and not by way of limitation, a particular concept node corresponding to a particular photo may have a privacy setting specifying that the photo may be accessed only by users tagged in the photo and friends of the users tagged in the photo. In particular examples, privacy settings may allow users to opt in to or opt out of having their content, information, or actions stored/logged by the social-networking system or shared with other systems (e.g., a third-party system). Although this disclosure describes using particular privacy settings in a particular manner, this disclosure contemplates using any suitable privacy settings in any suitable manner.

In particular examples, privacy settings may be based on one or more nodes or edges of a social graph. A privacy setting may be specified for one or more edges or edge-types of the social graph, or with respect to one or more nodes or node-types of the social graph. The privacy settings applied to a particular edge connecting two nodes may control whether the relationship between the two entities corresponding to the nodes is visible to other users of the online social network. Similarly, the privacy settings applied to a particular node may control whether the user or concept corresponding to the node is visible to other users of the online social network. As an example and not by way of limitation, a user, such as a user 102(1) and/or 104(1), may share an object to the social networking system 106. The object may be associated with a concept node connected to a user node of the user 102(1) by an edge. The user 102(1) may specify privacy settings that apply to a particular edge connecting to the concept node of the object, or may specify privacy settings that apply to all edges connecting to the concept node. In some examples, the user 102(1) may share a set of objects of a particular object-type (e.g., a set of images). The user 102(1) may specify privacy settings with respect to all objects associated with the user 102(1) of that particular object-type as having a particular privacy setting (e.g., specifying that all images posted by the user 102(1) are visible only to friends of the user and/or users tagged in the images).

In particular examples, the social networking system 106 may present a "privacy wizard" (e.g., within a webpage, a module, one or more dialog boxes, or any other suitable interface) to the user 102(1) to assist the user in specifying one or more privacy settings. The privacy wizard may display instructions, suitable privacy-related information, current privacy settings, one or more input fields for accepting one or more inputs from the first user specifying a change or confirmation of privacy settings, or any suitable combination thereof. In particular examples, the social networking system 106 may offer a "dashboard" functionality to the user 102(1) that may display, to the user 102(1), current privacy settings of the user 102(1). The dashboard functionality may be displayed to the user 102(1) at any appropriate time (e.g., following an input from the user 102(1) summoning the dashboard functionality, following the occurrence of a particular event or trigger action). The dashboard functionality may allow the user 102(1) to modify one or more of the user's current privacy settings at any time, in any suitable manner (e.g., redirecting the user 102(1) to the privacy wizard).

Privacy settings associated with an object may specify any suitable granularity of permitted access or denial of access. As an example and not by way of limitation, access or denial of access may be specified for particular users (e.g., only me, my roommates, my boss), users within a particular degree-of-separation (e.g., friends, friends-of-friends), user groups (e.g., the gaming club, my family), user networks (e.g., employees of particular employers, students or alumni of particular university), all users ("public"), no users ("private"), users of third-party systems, particular applications (e.g., third-party applications, external websites), other suitable entities, or any suitable combination thereof. Although this disclosure describes particular granularities of permitted access or denial of access, this disclosure contemplates any suitable granularities of permitted access or denial of access.

In particular examples, one or more servers of the social networking system 106 may be authorization/privacy servers for enforcing privacy settings. In response to a request from the user 102(1) (or other entity) for a particular object stored in a data store, the social networking system 106 may send a request to the data store for the object. The request may identify the user 102(1) associated with the request and the object may be sent only to the user 102(1) (or a client system of the user) if the authorization server determines that the user 102(1) is authorized to access the object based on the privacy settings associated with the object. If the requesting user is not authorized to access the object, the authorization server may prevent the requested object from being retrieved from the data store or may prevent the requested object from being sent to the user. In the search-query context, an object may be provided as a search result only if the querying user is authorized to access the object, e.g., if the privacy settings for the object allow it to be surfaced to, discovered by, or otherwise visible to the querying user. In particular examples, an object may represent content that is visible to a user through a newsfeed of the user. As an example and not by way of limitation, one or more objects may be visible to a user's "Trending" page. In particular examples, an object may correspond to a particular user. The object may be content associated with the particular user, or may be the particular user's account or information stored on the social networking system 106, or other computing system. As an example and not by way of limitation, the user 102(1) may view one or more other users 104(1) . . . 102(n) of an online social networking system through a "People You May Know" function of the online social network, or by viewing a list of friends of the user 102(1). As an example and not by way of limitation, the user 102(1) may specify that they do not wish to see objects associated with a particular other user (e.g., the user 104(1)) in their newsfeed or friends list. If the privacy settings for the object do not allow it to be surfaced to, discovered by, or visible to the user 102(1), the object may be excluded from the search results. Although this disclosure describes enforcing privacy settings in a particular manner, this disclosure contemplates enforcing privacy settings in any suitable manner.

In particular examples, different objects of the same type associated with a user may have different privacy settings. Different types of objects associated with a user may also have different types of privacy settings. As an example and not by way of limitation, the user 102(1) may specify that the user's status updates are public, but any images shared by the user are visible only to the user's friends on the online social network. In some examples, the user 102(1) may specify different privacy settings for different types of entities, such as individual users, friends-of-friends, followers, user groups, or corporate entities. In some examples, the user 102(1) may specify a group of users that may view videos posted by the user 102(1), while keeping the videos from being visible to the user's employer. In particular examples, different privacy settings may be provided for different user groups or user demographics. As an example and not by way of limitation, the user 102(1) may specify that other users who attend the same university as the user 102(1) may view the user's pictures, but that other users who are family members of the user 102(1) may not view those same pictures.

In particular examples, the social networking system 106 may provide one or more default privacy settings for each object of a particular object-type. A privacy setting for an object that is set to a default may be changed by a user associated with that object. As an example and not by way of limitation, all images posted by the user 102(1) may have a default privacy setting of being visible only to friends of the first user and, for a particular image, the user 102(1) may change the privacy setting for the image to be visible to friends and friends-of-friends.

In particular examples, privacy settings may allow the user 102(1) to specify (e.g., by opting out, by not opting in) whether the social networking system 106 may receive, collect, log, or store particular objects or information associated with the user 102(1) for any purpose. In particular examples, privacy settings may allow the user 102(1) to specify whether particular applications or processes may access, store, or use particular objects or information associated with the user. The privacy settings may allow the user 102(1) to opt in or opt out of having objects or information accessed, stored, or used by specific applications or processes. The social networking system 106 may access such information in order to provide a particular function or service to the user 102(1), without the social networking system 106 having access to that information for any other purposes. Before accessing, storing, or using such objects or information, the social networking system 106 may prompt the user 102(1) to provide privacy settings specifying which applications or processes, if any, may access, store, or use the object or information prior to allowing any such action. As an example and not by way of limitation, the user 102(1) may transmit a message to the user 104(1) via an application related to the online social networking system (e.g., a messaging app), and may specify privacy settings that such messages should not be stored by the social networking system 106.

In particular examples, the user 102(1) may specify whether particular types of objects or information associated with the user 102(1) may be accessed, stored, or used by the social networking system 106. As an example and not by way of limitation, the user 102(1) may specify that images sent by the user 102(1) through the social networking system 106 may not be stored by the social networking system 106. In some examples, the user 102(1) may specify that messages sent from the user 102(1) to another user 104(1) may not be stored by the social networking system 106. In some cases, the user 102(1) may specify that all objects sent via a particular application may be saved by the social networking system 106.

In particular examples, privacy settings may allow the user 102(1) to specify whether particular objects or information associated with the user 102(1) may be accessed from particular client systems or third-party systems. The privacy settings may allow the user 102(1) to opt in or opt out of having objects or information accessed from a particular device (e.g., the phone book on a user's smart phone), from a particular application (e.g., a messaging app), or from a particular system (e.g., an email server). The social networking system 106 may provide default privacy settings with respect to each device, system, or application, and/or the user 102(1) may be prompted to specify a particular privacy setting for each context. As an example and not by way of limitation, the user 102(1) may utilize a location-services feature of the social networking system 106 to provide recommendations for restaurants or other places in proximity to the user 102(1). The default privacy settings of the user 102(1) may specify that the social networking system 106 may use location information provided from the computing device 108 of the user 102(1) to provide the location-based services, but that the social networking system 106 may not store the location information of the user 102(1) or provide it to any third-party system. The user 102(1) may then update the privacy settings to allow location information to be used by a third-party image-sharing application in order to geo-tag photos.

In particular examples, privacy settings may allow a user to engage in the ephemeral sharing of objects on the online social network. Ephemeral sharing refers to the sharing of objects (e.g., posts, photos) or information for a finite period of time. Access or denial of access to the objects or information may be specified by time or date. As an example and not by way of limitation, a user may specify that a particular image uploaded by the user is visible to the user's friends for the next week, after which time the image may no longer be accessible to other users. In some examples, a company may post content related to a product release ahead of the official launch, and specify that the content may not be visible to other users until after the product launch.

In particular examples, for particular objects or information having privacy settings specifying that they are ephemeral, the social networking system 106 may be restricted in its access, storage, or use of the objects or information. The social networking system 106 may temporarily access, store, or use these particular objects or information in order to facilitate particular actions of a user associated with the objects or information, and may subsequently delete the objects or information, as specified by the respective privacy settings. As an example and not by way of limitation, the user 102(1) may transmit a message to the user 104(1), and the social networking system 106 may temporarily store the message in a data store until the user 104(1) has viewed or downloaded the message, at which point the social networking system 106 may delete the message from the data store. In some examples, continuing with the prior example, the message may be stored for a specified period of time (e.g., 2 weeks), after which point the social networking system 106 may delete the message from the data store.

In particular examples, changes to privacy settings may take effect retroactively, affecting the visibility of objects and content shared prior to the change. As an example and not by way of limitation, the user 102(1) may share a first image and specify that the first image is to be public to all other users. At a later time, the user 102(1) may specify that any images shared by the user 102(1) should be made visible only to a first user group. The social networking system 106 may determine that this privacy setting also applies to the first image and make the first image visible only to the first user group. In particular examples, the change in privacy settings may take effect only going forward. Continuing the example above, if the user 102(1) changes privacy settings and then shares a second image, the second image may be visible only to the first user group, but the first image may remain visible to all users. In particular examples, in response to a user action to change a privacy setting, the social networking system 106 may further prompt the user to indicate whether the user wants to apply the changes to the privacy setting retroactively. In particular examples, a user change to privacy settings may be a one-off change specific to one object. In particular examples, a user change to privacy may be a global change for all objects associated with the user.

In particular examples, the social networking system 106 may determine that user 102(1) may want to change one or more privacy settings in response to a trigger action associated with the user 102(1). The trigger action may be any suitable action on the online social network. As an example and not by way of limitation, a trigger action may be a change in the relationship between a first and second user of the online social networking system (e.g., "un-friending" a user, changing the relationship status between the users, etc.). In particular examples, upon determining that a trigger action has occurred, the social networking system 106 may prompt the user 102(1) to change the privacy settings regarding the visibility of objects associated with the user 102(1). The prompt may redirect the user 102(1) to a workflow process for editing privacy settings with respect to one or more entities associated with the trigger action. The privacy settings associated with the user 102(1) may be changed only in response to an explicit input from the user 102(1), and may not be changed without the approval of the user 102(1). As an example and not by way of limitation, the workflow process may include providing the user 102(1) with the current privacy settings with respect to the user 104(1) or to a group of users (e.g., un-tagging the user 102(1) or the user 104(1) from particular objects, changing the visibility of particular objects with respect to the user 104(1) or a group of users), and receiving an indication from the user 102(1) to change the privacy settings based on any of the methods described herein, or to keep the existing privacy settings.

In particular examples, a user may need to provide verification of a privacy setting before allowing the user to perform particular actions on the online social network, or to provide verification before changing a particular privacy setting. When performing particular actions or changing a particular privacy setting, a prompt may be presented to the user to remind the user of his or her current privacy settings and to ask the user to verify the privacy settings with respect to the particular action. Furthermore, a user may need to provide confirmation, double-confirmation, authentication, or other suitable types of verification before proceeding with the particular action, and the action may not be complete until such verification is provided. As an example and not by way of limitation, a user's default privacy settings may indicate that a person's relationship status is visible to all users (i.e., "public"). However, if the user changes his or her relationship status, the social networking system 106 may determine that such action may be sensitive and may prompt the user to confirm that his or her relationship status should remain public before proceeding. In some examples, a user's privacy settings may specify that the user's posts are visible only to friends of the user. However, if the user changes the privacy setting for his or her posts to being public, the social networking system 106 may prompt the user with a reminder of the user's current privacy settings of posts being visible only to friends, and a warning that this change will make all of the user's past posts visible to the public. The user may then be required to provide a second verification, input authentication credentials, or provide other types of verification before proceeding with the change in privacy settings. In particular examples, a user may need to provide verification of a privacy setting on a periodic basis. A prompt or reminder may be periodically sent to the user based either on time elapsed or a number of user actions. As an example and not by way of limitation, the social networking system 106 may send a reminder to the user to confirm his or her privacy settings every six months or after every ten photo posts. In particular examples, privacy settings may also allow users to control access to the objects or information on a per-request basis. As an example and not by way of limitation, the social networking system 106 may notify the user whenever a third-party system attempts to access information associated with the user, and require the user to provide verification that access should be allowed before proceeding.

Figure 2:
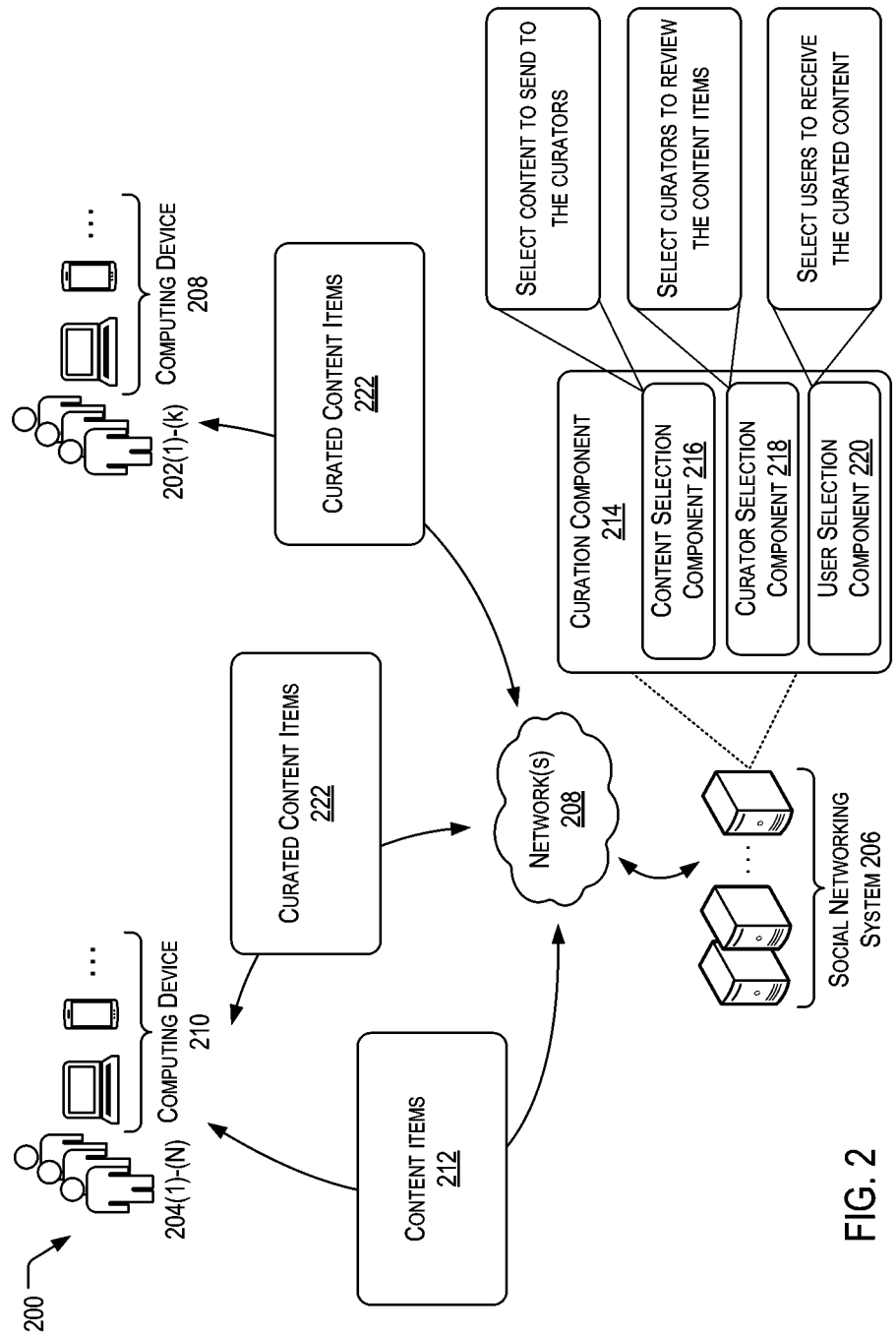
FIG. 2 is another view of an example system usable to curate content items for users independent of the popularity of the content item or the creator, according to some implementations.
Figure 3:
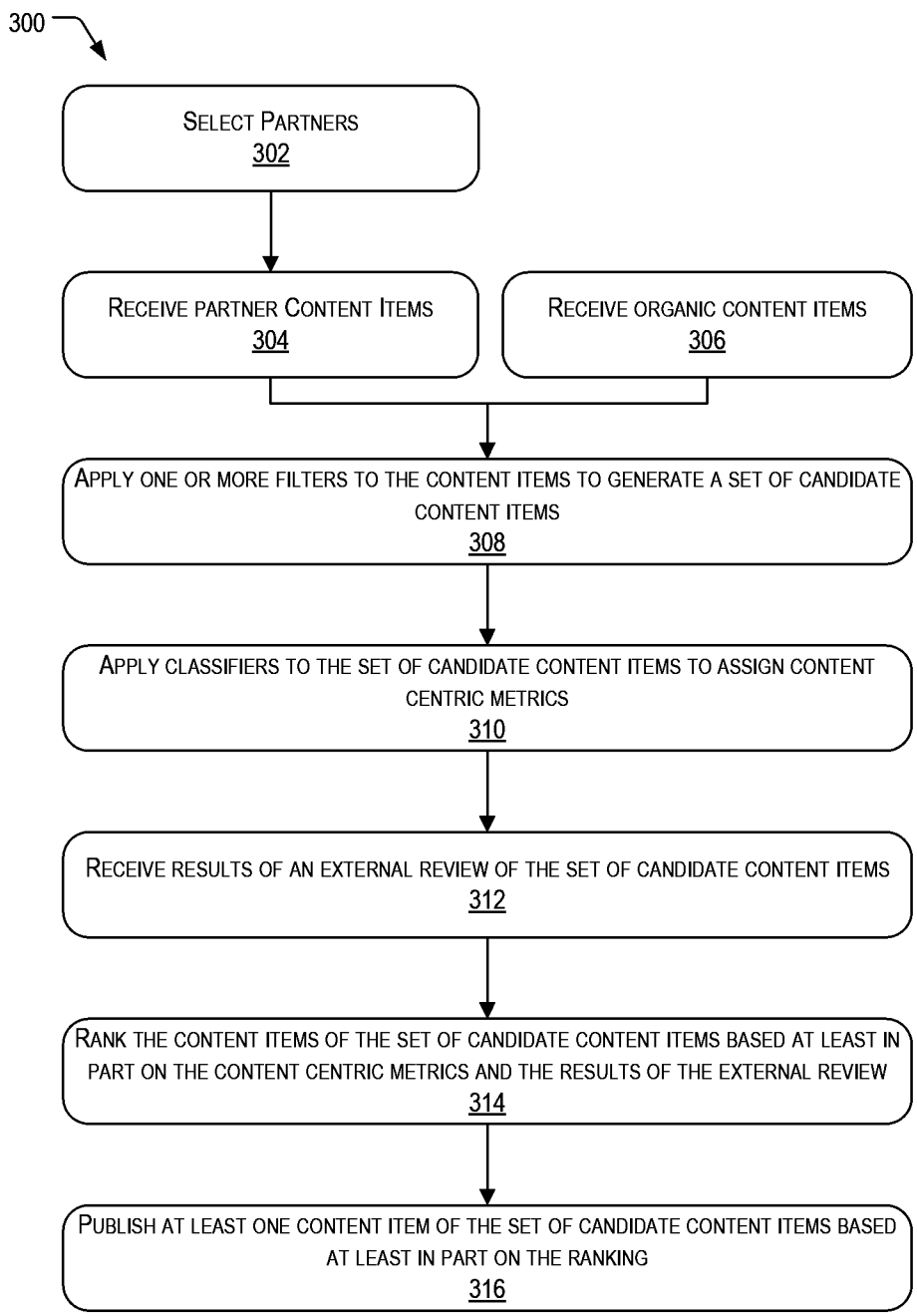
FIG. 3 is a flow diagram illustrating an example process for curating content items according to some implementations.
Figure 4:
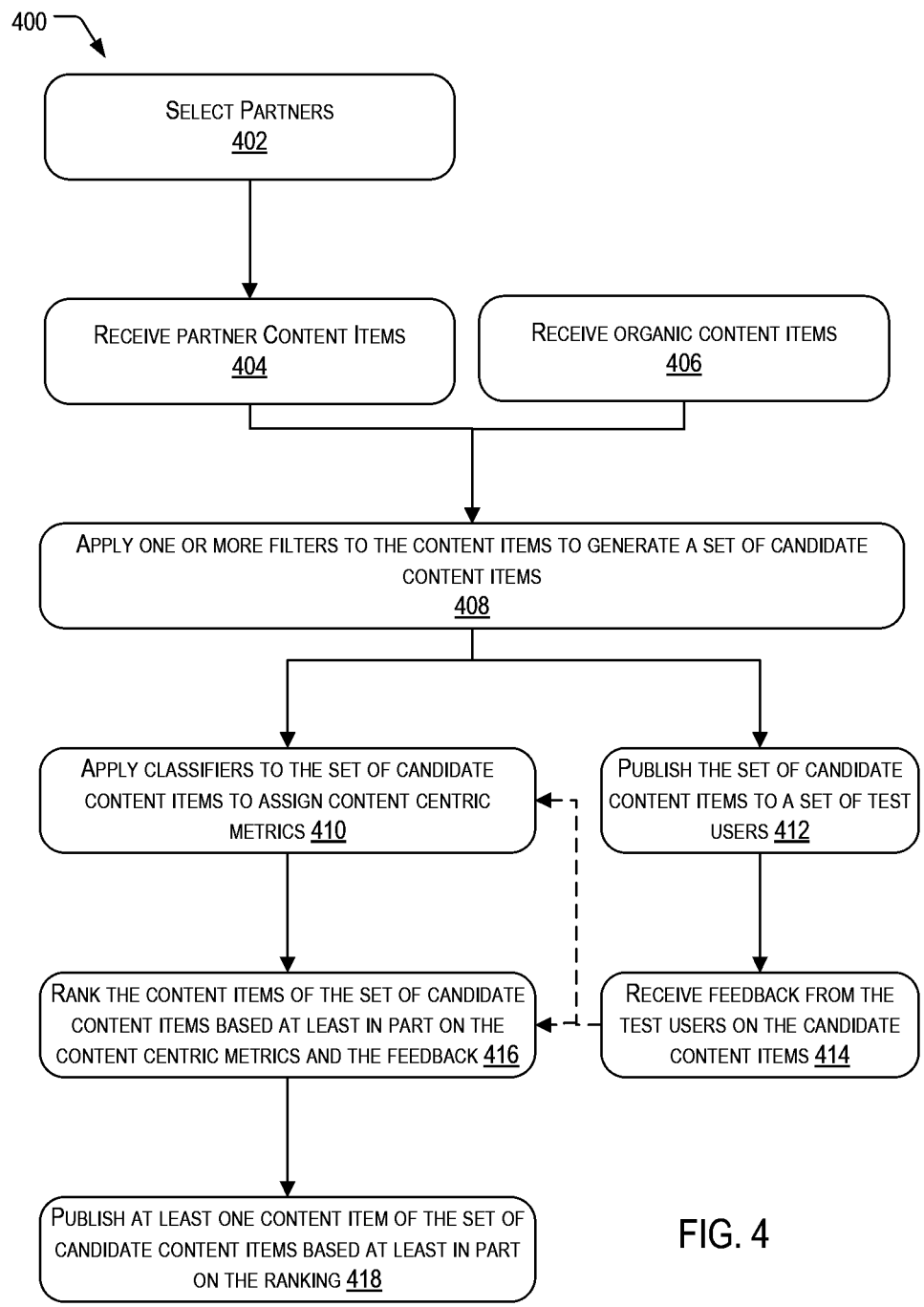
FIG. 4 is another flow diagram illustrating an example process for curating content items according to some implementations.

FIGS. 2-4 are flow diagrams illustrating example processes associated with the content curation discussed above. The processes are illustrated as a collection of blocks in a logical flow diagram, which represent a sequence of operations, some or all of which can be implemented in hardware, software, or a combination thereof. In the context of software, the blocks represent computer-executable instructions stored on one or more computer-readable media that, which when executed by one or more processors, perform the recited operations. Generally, computer-executable instructions include routines, programs, objects, components, encryption, deciphering, compressing, recording, data structures and the like that perform particular functions or implement particular abstract data types.

The order in which the operations are described should not be construed as a limitation. Any number of the described blocks can be combined in any order and/or in parallel to implement the processes, or alternative processes, and not all of the blocks need be executed. For discussion purposes, the processes herein are described with reference to the frameworks, architectures and environments described in the examples herein, although the processes may be implemented in a wide variety of other frameworks, architectures or environments.

FIG. 2 is another view of an example system 200 usable to curate content items for users 202(1)-(k) independent of the popularity of the content item or the creator, according to some implementations. In the illustrated example, a social networking system 206 (such as the social networking system 106 of FIG. 1) may employ content curators 204(1)-(n) to review and evaluate at least a portion of content items 212 created by the content creators (not shown). In some examples, consuming users 202(1)-(k) (collectively "consuming users 202") and the content curators 204(1)-(n) (collectively "content curators 204") interact with the social networking system 206 using various types of computing devices, respectively indicated by 208 and 210.

In the illustrated example, creators may generate the content items 212 for publication via the social networking system 206. The content items 212 may be of variable quality, value, and/or interest to the consuming users 202, as discussed above. In the current example, at least a portion of the content items 212 may be provided to one or more of the content curators 204(1)-(n). In this example, in addition to the automated review discussed above with respect to FIG. 1, the content curators 204 may also rate and/or evaluate the content items 212 based on objective and subjective qualities. For instance, the content items 212 may be evaluated based on video, image, and/or audio quality, length of the content item 212, and the like. The content items 212 may also be evaluated based on subjective qualities, such as interest of the content curator 204(1)-(n), delivery by the content creator (e.g., speech quality, clearness, presence, and the like), presence of humor, suspense, or other emotional quality, and the like.

In some cases, the curated content items 222 (e.g., the content items 212 selected by the content curators 204(1)-(n)) may be published by the social networking system 206 to at least a portion of the users 202(1)-(k) via a network 208. Alternatively or additionally, the curated content items 222 may be utilized as an input to train a machine learned model or network (such as a neural network) that may be used by the social networking system 206 to generate content centric metrics and publish curated content as discussed above with respect to FIG. 1.

In the illustrated example, the social networking system 206 may include a curation component 214. The curation component 214 may itself include a content selection component 216, a curator selection component 218, and a user selection component 220. The content selection component 216 may be configured to apply one or more quantitative and/or objective thresholds to the content items 212, as discussed herein, to select a set of content items 212 for review by the content curators 204. For example, the content selection component 216 may apply one or more thresholds based on an objective or quantitative metric to each content item. In some cases, the social networking system 206 may publish content items 212 meeting or exceeding a first threshold (e.g., an auto-publish threshold). The social networking system 206 may also eliminate content items 212 failing to meet or exceed a second threshold (e.g., minimum publication threshold). In this example, the content items 212 that are between the first threshold and the second threshold may be sent to the content curators 204 for additional evaluation. As an illustrative example, if a first content item scores within the ninth percentile or higher with respect to other candidate content items, the social networking system 206 may publish the first content item without any additional review (such as curator review). Additionally or alternatively, if a second content item scores within the bottom tenth percentile with respect to the other candidate content items, the social networking system 206 may remove the second content item from consideration as a candidate content item. As another illustrative example, if a first content item scores a ninety out of a possible one hundred on the content centric metrics, the social networking system 206 may publish the first content item without any additional review (such as curator review). Additionally or alternatively, if a second content item scores below ten out of the possible one hundred on the content centric metrics, the social networking system 206 may remove the second content item from consideration as a candidate content item.

In examples, the content selection component 216 may randomly select content items 212 to send to the content curators 204. Alternatively or additionally, the content selection component 216 may apply one or more models or networks (such as a machine learned model) to select the content items 212 to provide to the content curators 204 based on various criteria, such as subject matter, quality, creator, and the like. In some cases, the content selection component 216 may also evaluate how often the creator's content causes the generation of supplemental content. For example, if a creator is more likely to generate supplemental or additional content when a content item reaches a threshold audience level, the content item created by the content creator may be selected by the content selection component 216 over content created by other users.

The curator selection component 218 may be configured to apply one or more classifiers or machine learned models to assign the selected content items 212 to specific content curators 204. For example, the curator selection component 218 may match curators to the subject matter of a content item based on, for instance, a predetermined assignment or mapping. As an illustrative example, if the creator has a history of recording supplemental content when a particular content item is viewed by more than a threshold number of users (such as 5, 50, 100, 1000, or the like), the scoring component 118 may select the creator's content item for increased publication (e.g., another round of publication) if the content item is approaching (e.g., within 5%, within 10%, etc.) the threshold number of users. For instance, if a creator historically generates supplemental content when approximately 100 users view the creator's content, the curator selection component 218 may select the content item if the content item is within ten percentage points (e.g., has ninety views) or increased publication. Similarly, if another creator typically generates supplemental content when a content items views reach approximately 1000, the curator selection component 218 may select the content item when the associated views exceeds 900 (e.g., ten percentile points from the threshold). The user selection component 220 may be configured to select a set of users to receive the curated content items 222. As discussed above, in some cases, the social networking system 206 may employ multiple series or sets of users 202 to filter the curated content items 222 for the users 202(1)-(k). For example, the user selection component 220 may select a first set of curated content items to be provided to a first set of the users 202, such as based on preferences of the users 202 and as described herein. The user selection component 220 may receive feedback from the first set of the users 202, in the form of consumption metrics, comments, tagging, sharing, and the like. Based on the feedback, the social networking system 206 may select a subset of the curated content items (e.g., the top 1, 5, 10, etc. curated content items and/or curated content items meeting or exceeding a feedback criteria). The user selection component 220 may then select a second set of the users 202 to receive the subset of the curated content items. In some cases, the set of users may be selected based on a preference of the users 202 and/or a consumption history, known likes and dislikes (e.g., typically purchased items, product categories, brands, etc.), and the like of the users 202.

In some cases, the subset of the curated content items 222 may be combined with other high performing (e.g., highly consumed) curated content items relative to other content items of other sets (e.g., viewed, liked, and/or commented on more than other curated content items) to form a second set of curated content items to be published to the second set of the users 202. In this manner, on each iteration content items that are well received by the users selected by the user selection component 220 may continue to be published to larger and larger groups of users 202.

FIG. 3 is a flow diagram illustrating an example process 300 for curating content items according to some implementations. As discussed above, the social networking system may include a curation component to score, rank, and select content items to deliver to various consuming users based on a content centric metrics. In this manner, the content items being presented do not rely on the popularity or following of the creator and, thus, more creators may utilize the social networking system to reach a wide audience base.

At 302, the social networking system may select partners for the creation of curated content items. For example, the social networking system may identify one or more creators that produce consistently high quality, entertaining, and/or relevant content to be included as a partner for the curation process. In some cases, the partners may be used to generate a minimum subset of content items on a regular basis that are of a quality level that may be published to the general consuming audience (e.g., the content items will exceed the filter thresholds).

At 304 and 306, the social networking system may receive partner content items from the selected partners and organic content items from various creators or users of the social networking system. The content items may include textual content, audio content, visual content, and the like. In some cases, the partner content items may include content form users that have been prescreened or known to produced high quality content. The organic content items may be those produced by other users of the social networking system.

At 308, the social networking system may apply one or more filters to the content items to generate a set of candidate content items. For example, the filters may include one or more minimum thresholds associated with the content quality in an objective manner. For instance, the social networking system may apply a resolution or pixel count filter, a lighting quality filter, an audio quality filter, a background noise filter, and the like. The remaining content items may be used as the set of candidate content items in which each content item meets a minimum quality standard for consideration of publication via the social networking system. In some cases, the partner content item filtering may differ from the organic content item filtering (e.g., the partner content item may receive a lighter or more lax filtering than organic content).

At 310, the social networking system may apply one or more classifiers or machine learned models to the set of candidate content items to assign one or more content centric metrics to the content items. For example, the social networking system may apply classifiers or machine learned models trained to determine the content of the content items to identify and score the content items as including various types of features, events, or responses associated with the content items. Discussed herein, the classifiers and/or machine learned models may include an artificial neural network configured to detect and/or classify speech, text, video, audio, or other content as particular types of content.

At 312, the social networking system may receive the results of an external review of the set of candidate content items. In some cases, the results of the external review may correspond to one or more of the content centric metrics determined at 310. In other cases, the results of the external review may relate to other scores that may be used to rank the content items of the set of candidate content items prior to curation and/or publication. In one particular example, the external review may be performed by a human curator or inspector.

At 314, the social networking system may rank the content items of the set of candidate content items based at least in part on the content centric metrics and the results of the external review. For example, the ranking may be based on specific metrics selected based on the user that may potentially consume the content items, a combination of the content centric metrics (e.g., a weighted average of the metrics and results based on the creator, the consuming user, etc.), or a totaled sum of the content centric metrics and the results of the external review. In some cases, the results of the external review may be used to apply weighted values to each of the content centric metrics prior to ranking. For example, the social networking system may use results of the external review to weight stability of the camera that captured a video higher than whether a speaker is centered in a frame of the video.

At 316, the social networking system may publish at least one content item of the set of content items based at least in part on the ranking. For example, the social networking system may publish a predetermined number (e.g., 1, 5, 20, 100, etc.) of the highest-ranking content items of the set of candidate content items.

FIG. 4 is another flow diagram illustrating an example process 400 for curating content items according to some implementations. As discussed above, the social networking system may include a curation component to score, rank, and select content items to deliver to various consuming users based on a content centric metrics. In this manner, the content items being presented do not rely on a popularity or following of the creator and, thus, more creators may utilize the social networking system to reach a wide audience base. In some cases, the content items may be first published to a test set of users to determine an initial feedback prior to curation for the general consuming audience.

At 402, the social networking system may select partners for creation of curated content items. For example, the social networking system may identify one or more creators that produce consistently highly quality, entertaining, and/or relevant content to be included as a partner for the curation process. In some cases, the partners may be used to generate a minimum subset of content items on a regular basis that are of a quality level that may be published to the general consuming audience (e.g., the content items will exceed the filter thresholds).

At 404 and 406, the social networking system may receive partner content items from the selected partners and organic content items from various creators or users of the social networking system. The content items may include textual content, audio content, visual content, and the like.

At 408, the social networking system may apply one or more filters to the content items to generate a set of candidate content items. For example, the filters may include one or more minimum thresholds associated with the content quality in an objective manner. For instance, the social networking system may apply a resolution or pixel count filter, a lighting quality filter, an audio quality filter, a background noise filter, and the like. The remaining content items may be used as the set of candidate content items in which each content item meets a minimum quality standard for consideration of publication via the social networking system.

At 410, the social networking system may apply one or more classifiers or machine learned models to the set of candidate content items to assign one or more content centric metrics to the content items. For example, the social networking system may apply classifiers or machine learned models trained to determine the content of the content items to identify and score the content items as including various types of features, events, or responses associated with the content items. Discussed herein, the classifiers and/or machine learned models may include an artificial neural network configured to detect and/or classify speech, text, video, audio, or other content as particular types of content.

At 412, the social networking system may publish the set of candidate content items to a set of test users. For example, the test users may opt in or otherwise qualify to act as test users. In some cases, the users may be selected by the social networking system to act as test users based on an amount of activity or responsiveness of the individual users (e.g., the amount of interactions or feedback that the users provided). In some cases, the number of candidate content items published to any test users may be limited below a threshold number within a predefined period of time (such as no more than 2, 3, 5, 10 per day). It should also be understood that different test users may receive publications of different candidate content items.

At 414, the social networking system may receive feedback from the test users on content items of the set of candidate content items. In some cases, the feedback may be, for instance, a number of times a user watches or re-watches a candidate content item, a number of times a candidate content item is shared, amount or number of supplemental content posted in response to a candidate content item, amount of additional content a test user consumes from a creator of the candidate content item after consuming the candidate content item, and the like. In some cases, the feedback may be used as an input to the classifiers discussed above with respect to 410. In other cases, the feedback may be used in conjunction with the ranking discussed below with respect to 416.

At 416, the social networking system may rank the content items of the set of candidate content items based at least in part on the content centric metrics and/or the feedback. For example, the ranking may be based on specific metrics selected based on the user that may potentially consume the content items, a combination of the content centric metrics (e.g., a weighted average of the metrics and results based on the creator, the consuming user, etc.), or a totaled sum of the content centric metrics and the feedback. In some cases, the feedback may be used to apply weighted values to each of the content centric metrics prior to ranking.

At 418, the social networking system may publish at least one content item of the set of content items based at least in part on the ranking. For example, the social networking system may publish a predetermined number of the highest-ranking content items of the set of candidate content items.

Figure 5:
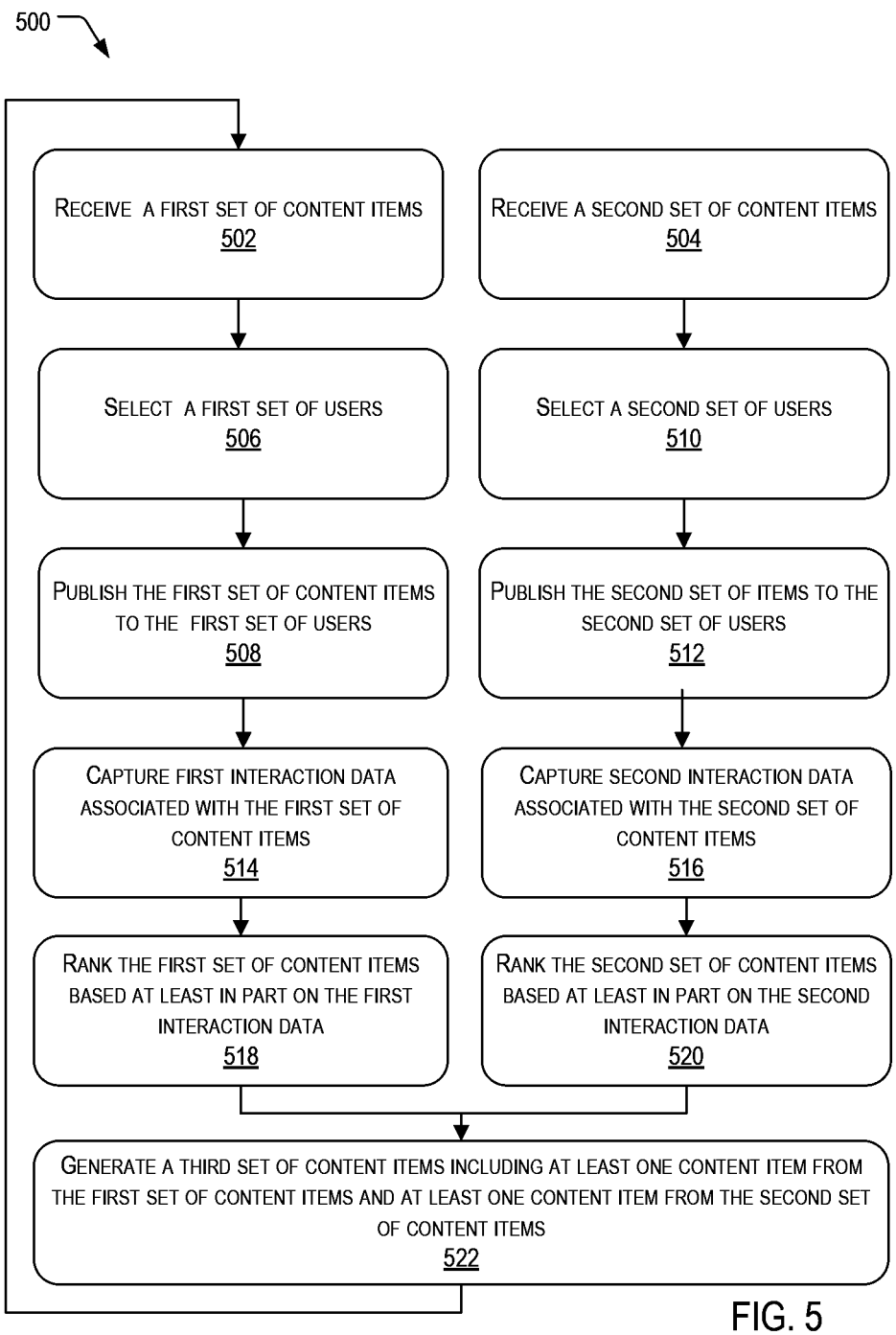
FIG. 5 is a block diagram of an example system for curating content items according to some implementations.

FIG. 5 is a block diagram of an example system 500 for publishing curating content items according to some implementations. As discussed above, the social networking system may publish the curated content items in sets to groups of users. The curated content items may then be published to larger groups based on performance (e.g., user feedback) with respect to other content items within the corresponding set. In this manner, the content items themselves compete with each other to reach larger and larger audiences.

At 502, the social networking system may receive a first set of content items. In some cases, the first set of content items may be curated by content creators or based on a content centric metric, as discussed above. In this example, the first set of content items may be ranked by the content curators and/or based on the content centric metrics.

At 504, the social networking system may receive a second set of content items. The second set of content items may be curated by content creators or based on a content centric metric, as discussed above. In this example, the second set of content items may also be ranked by the content curators and/or based on the content centric metrics.

At 506, the social networking system may select a first set of users and, at 508, the social networking system may publish the first set of candidate content items to the first set of users. For example, the social networking system may select the first set of users based on an opt in by the users to receive the curated content items, based on user data (such as consumption history, known preferences, etc.), and the like. In some cases, a portion of the first set of candidate content items may be published based at least in part on the ranking or score determined by the content curators or the content centric metrics. For instance, the highest-ranking content items within the first set of content items may be published (e.g., the top 10%, top 15%, top 25%, and the like).

At 510, the social networking system may select a second set of users and, at 512, the social networking system may publish the second set of candidate content items to the second set of users. For example, the social networking system may select the second set of users based on an opt in by the users to receive the curated content items, based on user data (such as consumption history, known preferences, etc.), and the like. In some cases, a portion of the second set of candidate content items may be published based at least in part on the ranking or score determined by the content curators or the content centric metrics. For instance, the highest-ranking content items within the second set of content items may be published (e.g., the top 10%, top 15%, top 25%, and the like).

At 514, the social networking system may capture first interaction data associated with the first set of content items. The first interaction data may include share data, consumption data, rating data (e.g., likes, thumbs up, starred, etc.), and the like. In some cases, the social networking system may capture the first interaction data over a predefined period of time (such as an hour, 10 hours, a day, a week, a month, etc.).

At 516, the social networking system may capture second interaction data associated with the second set of content items Similar to the first interaction data, the second interaction data may include share data, consumption data, rating data (e.g., likes, thumbs up, starred, etc.), and the like. In some cases, the social networking system may capture the second interaction data over the predefined period of time (such as an hour, 10 hours, a day, a week, a month, etc.).

At 518, the social networking system may rank the first set of content items based at least in part on the first interaction data. For example, the greater the interaction with a particular content item the higher the content item may rank in comparison to the other content items within the first set of content items. In some cases, weighted values may be applied to the different types of interactions. For example, a user consuming the entire content item may earn a predetermined value, while a user consuming a portion of the content item (e.g., between a first threshold and a second threshold) may earn only a portion of the predetermined value, such as half the predetermined value. Similarly, a like or thumbs up may earn a smaller value than the user sharing the content item with a friend.

At 520, the social networking system may rank the second set of content items based at least in part on the second interaction data. Similar, to ranking the first set of content items, the greater the interaction with a particular content item the higher the content item may rank in comparison to the other content items within the second set of content items. Again, weighted values may be applied to the different types of interactions.

At 522, the social networking system may generate a third set of content items including at least one content item from the first set of content items and one content item from the second set of content items. For example, the social networking system may select the top ranking (e.g., top 10%, top 15%, top 25%, etc.) content items from the first set of content items and the second set of content times to include in the third set of content items. In other cases, the social networking system may select any content items from the first set of content items and/or the second set of content items that met or exceed a threshold value or rank.

In the current example, two sets of content items are discussed. However, it should be understood, that any number of sets of content items may be published, ranked, and combined into additional sets. Further, it should be understood, that in some cases, the third set of candidate content items may iterate through steps 502-522 together with additional sets of candidate content items. In some cases, on each iteration the process 500 may increase the size of the first set of users and/or the second set of users, such that the higher ranking content items continue to publish to larger and larger audiences of users.

Figure 6:
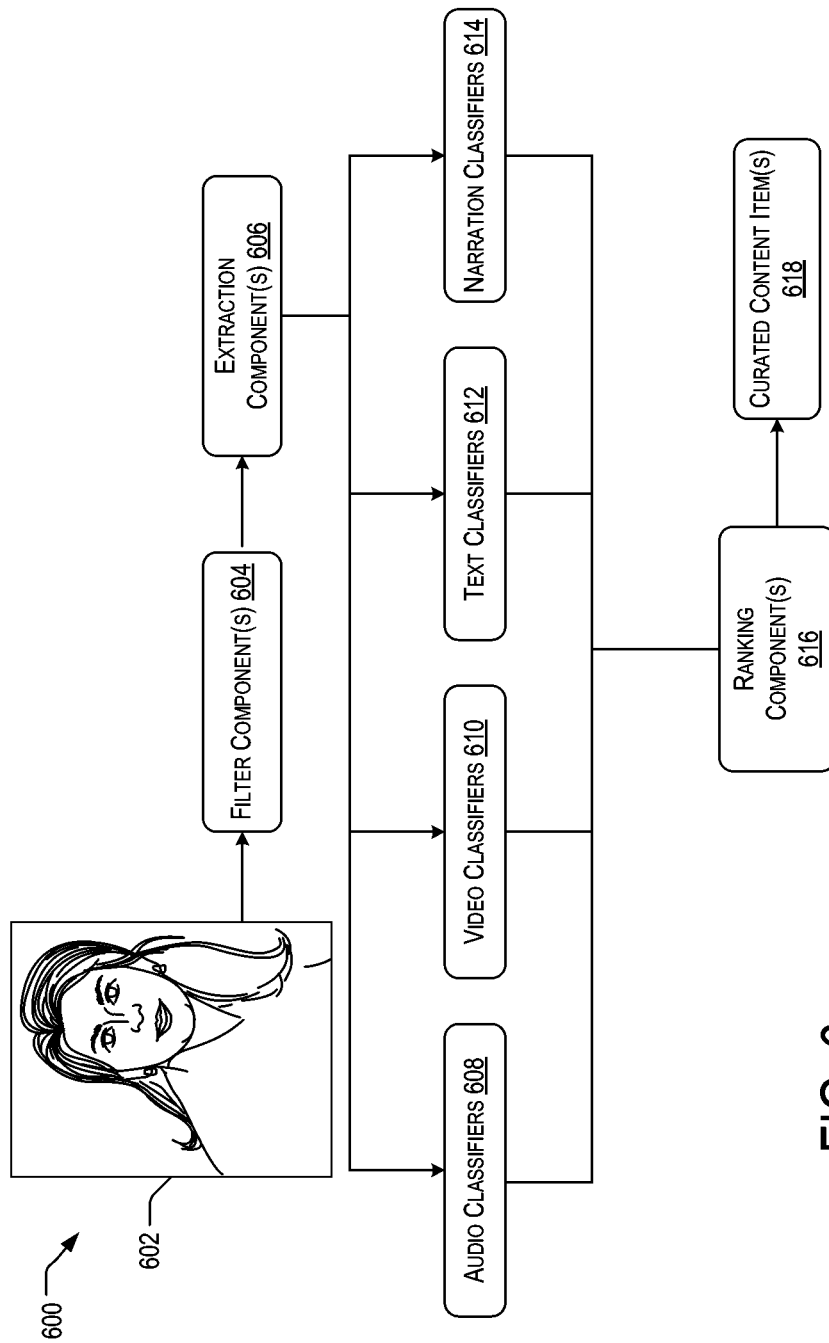
FIG. 6 is a block diagram of an example system for publishing curated content items according to some implementations.

FIG. 6 is a block diagram of an example system 600 for curating content items, such as content item 602, according to some implementations. In the illustrated example, a social networking system 600 may receive a content item 602 from a partner user or other user (e.g., a non-partner user) as discussed above with respect to FIGS. 3-5.

In the illustrated example, the content item 602 may be received by a filter component 604. The filter component 604 may be configured to apply one or more quantitative or objective thresholds to the content item 602 in order to determine if the content item 602 meets a minimum objective quality standard for publication as a curated content item. For example, the filter component 604 may apply one or more thresholds based on an objective or quantitative metric to each content item and each content item that fails to meet or exceed the threshold may be eliminated as a candidate content item. In some cases, the threshold may include audio quality thresholds, such as background noise below a predetermined decibel level, an image or video quality resolution above a predetermined resolution threshold, image or video quality frame rate above a predetermined frame rate threshold, an image or video quality below a predetermined jitter threshold, and the like.

If the content item 602 meets or exceeds the thresholds applied by the filter components 604, then the content item 602 may be provided to an extraction component 606. The extraction component 606 may be configured to extract portions or types of content from the content item 602. For example, the extraction component 606 may include translational components and/or optical character recognition components, to parse and extract portion of the content item 602. The translational component may extract parts of speech and sentences from the content item 602, differentiate between music, background noise, and voices, differentiate between different speakers, and the like. The optical character recognition components may be configured to extract text, organize text, and the like from the content item 602.

The extracted features or portions of the content item 602 may then be provided to one or more classifiers, such as an audio classifier 608, a video classifier 610, a text classifier 612, and/or a narration classifier 614. The various classifiers 608-614 may generate various or corresponding content centric metrics for the content item 602 based at least in part on processing the content item 602 or the extracted portions of the content item 602. In some cases, the classifiers 608-614 may apply one or more machine learned models or networks (such as a neural network) in order to detect features, events, or otherwise score the content item 602 with respect to the trained model. For example, the narration classifiers 614 may determine a metric related to how well the content item 602 corresponds to a narrative arc, narrative structures, and/or good content generation practices. In one specific example, the narration classifiers 614 may determine a metric related to how likely the consuming user is to finish or complete the content item 602.

The content centric metrics may then be received by a ranking component 616 that may rank and/or otherwise select the content item 602 for publication as a curated content item 618. For example, if content item 602 is ranked above a threshold by the ranking component 416, the content item 602 may be published as a curated content item 614 to one or more users. In some cases, the rank may be determined by a sum or weighted average of the content centric metrics. As discussed above, a weighted value may be applied by using an external review and/or by publishing the content item 602 to a test set of users and monitoring the feedback.

Figure 7:
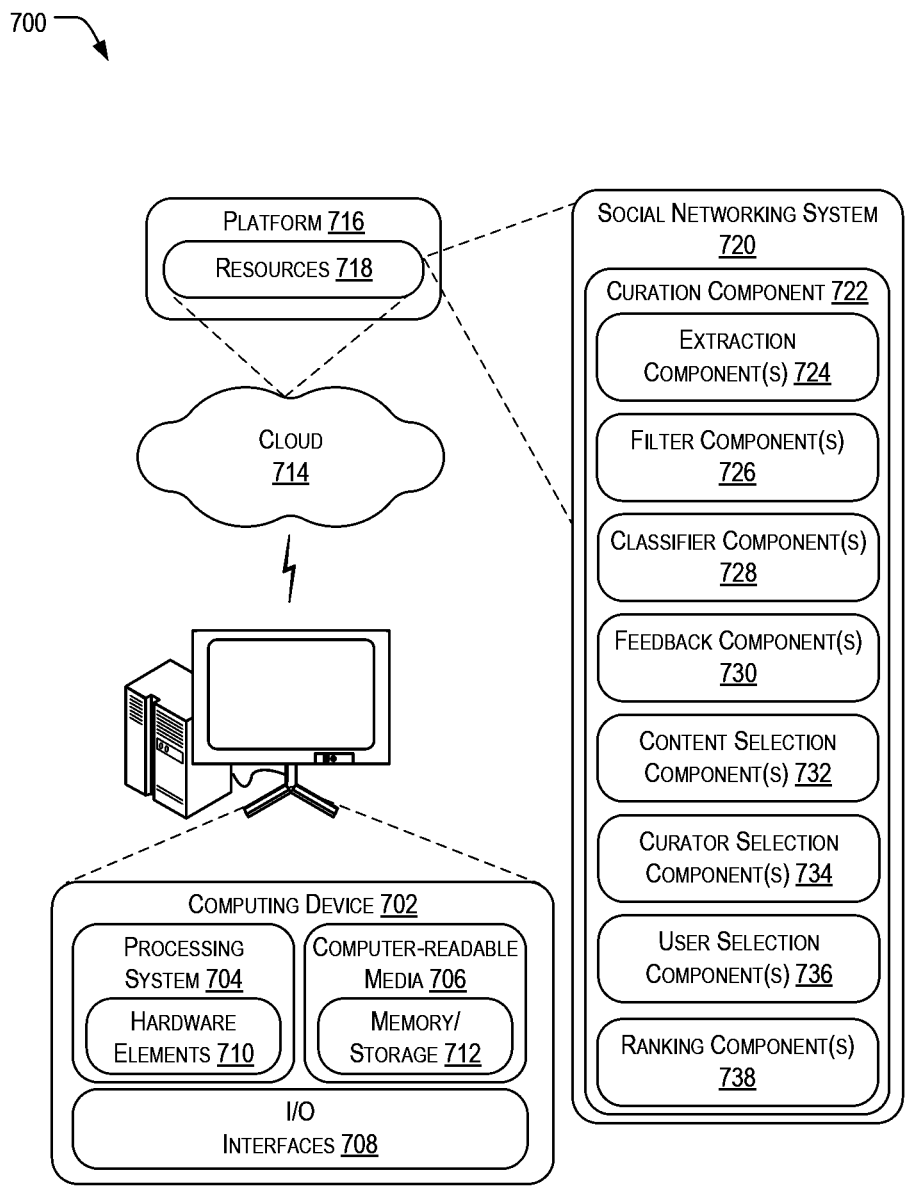
FIG. 7 is an example system and device that is usable to implement the techniques described herein.

FIG. 7 illustrates an example system generally at 700 that includes an example computing device 702 that is representative of one or more computing systems and/or devices that may implement the various techniques described herein. This is illustrated through inclusion of a social networking system 720, a curation component 722 comprising an extraction component 724, a filter component 726, a classifier component 728, a feedback component 730, content selection component 732, a curator selection component 734, a user selection component 736, a ranking component 738 as well as other components. The computing device 702 may be, for example, a server of a service provider, a device associated with a client (e.g., a client device), an on-chip system, and/or any other suitable computing device or computing system.

The extraction component 724 may be configured to extract portions or types of content from the content items. For example, the extraction component 724 may include a translational component and/or an optical character recognition component, to parse and extract portions of the content item. The translational component may extract parts of speech and sentences from the content item; differentiate between music, background noise, and voices; differentiate between different speakers; and the like. The optical character recognition component may be configured to extract text, organize text, and the like from the content item.

The filter component 726 may be configured to apply one or more quantitative and/or objective thresholds to the content items. For example, the filter component 726 may apply one or more thresholds based on an objective or quantitative metric to each content item, and each content item that fails to meet or exceed the threshold may be eliminated as a publication candidate. In some cases, the threshold may include audio quality thresholds, such as background noise below a predetermined decibel level (e.g., 25 decibels, 35 decibels, and the like), an image or video quality resolution above a predetermined resolution threshold (e.g., 540 pixels, 1080 pixels, and the like), image or video quality frame rate above a predetermined frame rate threshold (e.g., 45 frames per second, 50 frames per second, and the like), an image or video quality below a predetermined jitter threshold, and the like.

The classifier component 728 may be configured to score or rank candidate content items using one or more classifiers or machine learned models to the content item. For example, the classifier component 728 may utilize one or more audio, video, image, and/or text classifiers or machine learned models to determine features, events, user responses, and/or characters of portions of the content item. In various implementations, each classifier or machine learned model may be trained to determine specific features and to generate the content centric metrics for the content item based on the determined features.

The feedback component 730 may be configured to output curated content items to, for instance, a set of test users and to monitor user feedback associated with the curated content items. For example, the user feedback may take the form of a number of times a user watches or consumes a content item, a number of times a content item is shared, amount or number of supplemental content posted in response to a content item, amount of additional content a user consumes from a creator in response to viewing a content item, and the like. In some cases, the feedback component 730 may generate one or more feedback scores which may be used to rank or curate the content items in addition to the content centric metrics output by the scoring or classifier component 728.

The content selection component 732 may apply one or more thresholds based on an objective or quantitative metric to each content item. In some cases, the content selection component 732 may publish content items meeting or exceeding a first threshold (e.g., an auto-publish threshold). The content selection component 732 may also eliminate content items failing to meet or exceed a second threshold (e.g., minimum publication threshold), as discussed above. In this example, the content items that are between the first threshold and the second threshold may be sent to the content curators for additional evaluation.

In some cases, the content selection component 732 may randomly select content items to send to the content curators. Alternatively or additionally, the content selection component 732 may apply one or more models or networks (such as a machine learned model) to select the content items to provide to the content curators based on various criteria, such as subject matter, quality, creator, and the like.

The curator selection component 734 may be configured to apply one or more classifiers or machine learned models to assign the selected content items to specific content curators. For example, the curator selection component 734 may match curators to subject matter of a content item based on, for instance, a predetermined assignment or mapping, as discussed above with respect to FIG. 2.

The user selection component 736 may be configured to select a set of users to receive the curated content items, as discussed herein. As discussed above, in some cases, the social networking system 206 may employ multiple series or sets of users to filter the curated content items for the general user audience. For example, the user selection component 736 may select a first set of curated content items to be provided to a first set of the users. The user selection component 736 may receive feedback from the first set of the users, in the form of consumption metrics, comments, tagging, sharing, and the like. Based on the feedback, the social networking system may select a subset of the curated content items. The user selection component 736 may then select a second set of the users to receive the subset of the curated content items. In some cases, the subset of the curated content items may be combined with other high performing curated content items to form a second set of curated content items to be published to the second set of the users. In this manner, on each iteration content items that are well received by the users selected by the user selection component 736 may continue to be published to larger and larger groups of users.

The ranking component 738 may be configured to receive the content centric metrics and to rank and/or otherwise select the content item for publication as a curated content item based on the ranking. For example, if content item is ranked above a threshold by the ranking component 738, the content item may be published as a curated content item to one or more users. In some cases, the rank may be determined by a sum or weighted average of the content centric metrics.

The example computing device 702 as illustrated includes a processing system 704, one or more computer-readable media 706, and one or more I/O interfaces 708 that are communicatively coupled, one to another. Although not shown, the computing device 702 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 704 is representative of functionality to perform one or more operations using hardware. Accordingly, the processing system 504 is illustrated as including hardware elements 710 that may be configured as processors, functional blocks, and so forth. This may include implementation in hardware as an application specific integrated circuit or other logic device formed using one or more semiconductors. The hardware elements 710 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 706 is illustrated as including memory/storage 712. The memory/storage 712 represents memory/storage capacity associated with one or more computer-readable media. The memory/storage component 712 may include volatile media (such as random access memory (RAM)) and/or nonvolatile media (such as read only memory (ROM), Flash memory, optical disks, magnetic disks, and so forth). The memory/storage component 712 may include fixed media (e.g., RAM, ROM, a fixed hard drive, and so on) as well as removable media (e.g., Flash memory, a removable hard drive, an optical disc, and so forth). The computer-readable media 506 may be configured in a variety of other ways as further described below.

Input/output interface(s) 708 are representative of functionality to allow a user to enter commands and information to computing device 702, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 702 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," "logic," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on and/or transmitted across some form of computer-readable media. The computer-readable media may include a variety of media that may be accessed by the computing device 702. By way of example, and not limitation, computer-readable media may include "computer-readable storage media" and "computer-readable transmission media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer-readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable transmission media" may refer to a medium that is configured to transmit instructions to the hardware of the computing device 702, such as via a network. Computer-readable transmission media typically may transmit computer-readable instructions, data structures, program modules, or other data in a modulated data signal, such as carrier waves, data signals, or other transport mechanism. Computer-readable transmission media also include any information delivery media. The term "modulated data signal" means a signal that has one or more of its characteristics set or changed in such a manner as to encode information in the signal. By way of example, and not limitation, computer-readable transmission media include wired media such as a wired network or direct-wired connection, and wireless media such as acoustic, radio frequency (RF), infrared, and other wireless media.

As previously described, hardware elements 710 and computer-readable media 506 are representative of modules, programmable device logic and/or device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 710. The computing device 702 may be configured to implement particular instructions and/or functions corresponding to the software and/or hardware modules. Accordingly, implementation of a module that is executable by the computing device 702 as software may be achieved at least partially in hardware, e.g., through use of computer-readable storage media and/or hardware elements 710 of the processing system 704. The instructions and/or functions may be executable/operable by one or more articles of manufacture (for example, one or more computing devices 702 and/or processing systems 504) to implement techniques, modules, and examples described herein.

The techniques described herein may be supported by various configurations of the computing device 702 and are not limited to the specific examples of the techniques described herein. This functionality may also be implemented all or in part through use of a distributed system, such as over a "cloud" 714 via a platform 716 as described below.

The cloud 714 includes and/or is representative of a platform 716 for resources 718. The platform 716 abstracts underlying functionality of hardware (e.g., servers) and software resources of the cloud 714. The resources 718 may include applications and/or data that can be utilized while computer processing is executed on servers that are remote from the computing device 702. Resources 718 can also include services provided over the Internet and/or through a subscriber network, such as a cellular or Wi-Fi network.

The platform 716 may abstract resources and functions to connect the computing device 702 with other computing devices. The platform 716 may also be scalable to provide a corresponding level of scale to encountered demand for the resources 518 that are implemented via the platform 716.

Accordingly, in an interconnected device embodiment, implementation of functionality described herein may be distributed throughout multiple devices of the social networking system 500. For example, the functionality may be implemented in part on the computing device 502 as well as via the platform 716 which may represent a cloud computing environment 714.

CONCLUSION

Although the discussion above sets forth example implementations of the described techniques, other architectures may be used to implement the described functionality and are intended to be within the scope of this disclosure. Furthermore, although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A method comprising:
   receiving, from a first device, a first content item associated with a first class of users, the first content item to be shared on a social networking system;
   receiving, from a second device, a second content item associated with a second class of users, the second content item to be shared on the social networking system and the second class of users being different than the first class of users;
   selecting the first content item for publication based at least in part on the first content item meeting or exceeding at least one first threshold and the first content item being associated with the first class of users;
   in response to determining that the second content item is associated with the second class of users, determining, by the social networking system, that the second content item meets or exceeds at least one second threshold different from the first threshold;
   inputting, based at least in part on determining that the second content item meets or exceeds the at least one second threshold, the second content item into a machine learned model to determine a content centric metric associated with the second content item, the content centric metric including an image quality metric, an audio quality metric, and a narrative quality metric;
   receiving the content centric metric from the machine learned model;
   selecting the second content item for publication based at least in part on the content centric metric; and
   providing the second content item to a third device with an instruction to cause the third device to display at least an icon associated with the second content item in a user interface.

2. The method of claim 1, wherein the at least one second threshold includes at least one of:
   an image quality threshold;
   a video quality threshold; or
   an audio quality threshold.

3. The method of claim 1, further comprising:
   extracting a portion of the second content item; and
   wherein inputting the second content item into the machine learned model includes inputting the portion of the second content item into the machine learned model.

4. The method of claim 1, wherein the content centric metric is a first content centric metric and further comprising:
   inputting the second content item into a second machine learned model to determine a second content centric metric associated with the second content item;
   receiving the second content centric metric from the second machine learned model; and
   wherein selecting the second content item for publication is further based at least in part on the second content centric metric.

5. The method of claim 1, further comprising:
   receiving a result of an external review of the second content item;
   determining a value based on the result of the external review;
   applying the value to the content centric metric to determine a weighted content centric metric; and
   wherein selecting the second content item for publication is based at least in part on the weighted content centric metric.

6. The method of claim 1, wherein the user interface is a first user interface, the method further comprising:
   providing the second content item to a test user device with an instruction to cause the test user device to display at least an icon associated with the second content item in a second user interface;
   receiving, from the test user device, a user interaction with the second content item; and
   wherein selecting the second content item for publication is based at least in part on the user interaction.

7. The method of claim 6, further comprising:
   determining a value based on the user interaction;
   applying the value to the content centric metric to determine a weighted content centric metric; and
   wherein selecting the second content item for publication is based at least in part on the weighted content centric metric.

8. The method of claim 6, wherein the user interaction includes at least one of:
   a percentage of completion of the second content item consumed by a test user account associated with the test user device;
   a number of times the test user account consumed the second content item;
   a number of times the test user account shared the second content item with an additional user account of the social networking system;
   a first determination that the test user account created supplemental content after consuming the second content item; or
   a second determination that the test user account consumed additional content items associated with a creator user account that created the second content item.

9. The method of claim 1, wherein the second content item is part of a plurality of content items available for publication and the method further comprises:
   ranking the second content item and the plurality of content items based at least in part on the content centric metric; and wherein selecting the second content item for publication is based at least in part on the ranking of the second content item with respect to at least one of the plurality of content items.

10. The method of claim 9, wherein ranking the second content item and the plurality of content items is based at least in part on data associated with a user account associated with the third device.

11. The method of claim 9, wherein ranking the second content item and the plurality of content items is based at least in part on data associated with content items previously consumed by a user account associated with the third device.

12. The method of claim 1, further comprising:
inputting the second content item into a classifier;
receiving a feature associated with the second content item from a classifier; and
inputting the feature into the machine learned model to determine the content centric metric.

13. The method of claim 1, wherein the content centric metric is associated with at least one of:
an expected level of engagement of a user account associated with the third device with the second content item; or
an educational aspect of the second content item.

14. One or more non-transitory computer-readable media storing instructions that, when executed by one or more processors, cause one or more computing devices to perform operations comprising:
receiving a first content item for publication at a social networking system from a first user device associated with a first class of users;
receiving a second content item for publication at a social networking system from a second user device associated with a second class of users, the second class of users being different than the first class of users;
selecting the first content item for publication responsive to the first content item meeting or exceeding a filter threshold and the first content item being associated with the first class of users;
in response to determining that the second content item is associated with the second class of users, determining, by the social networking system, that the second content item meets or exceeds at least one second threshold different from the first threshold;
responsive to the second content item meeting or exceeding the at least one second threshold, determining a content centric metric associated with the second content item, the content centric metric including a narrative quality metric;
receiving a rating of the second content item, the rating selected by at least one curator associated with the social networking system;
selecting the second content item for publication based at least in part on the content centric metric and the rating; and
sending the second content item and the first content item to a set of user devices to cause individual ones of the set of user devices to display at least an icon associated with the second content item.

15. The one or more non-transitory computer-readable media as recited in claim 14, wherein the set of user devices is a first set of user devices and the operations further comprising:
receiving first interaction data associated with the second content item from individual ones of the first set of devices;
ranking the second content item with regards to at least one other content item based at least in part on the first interaction data associated with the second content item and second interaction data associated with the at least one other content item; and
sending the second content item to a second set of user devices to cause individual ones of the second set of user devices to display at least an icon associated with the second content item based at least in part on the ranking.

16. A system comprising:
one or more sensors;
one or more processors; and
one or more computer-readable media storing instructions that, when executed by the one or more processors, cause the one or more processors to perform operations comprising:
receiving a first content item at the system, the first content item associated with a first class of users;
receiving a second content item at the system, the second content item associated with a second class of users different from the first class of users;
selecting the first content item for publication based at least in part on the first content item meeting or exceeding a threshold and the first content item being associated with the first class of users;
in response to determining that the second content item is associated with the second class of users, determining, by the social networking system, that the second content item meets or exceeds at least one second threshold different from the first threshold;
responsive to the second content item meeting or exceeding the at least one second threshold, determining a content centric metric associated with the second content item, the content centric metric including an image quality metric, an audio quality metric, and a narrative quality metric;
selecting the second content item for publication via the system based at least in part on the content centric metric; and
sending the first content item and the second content item to a first set of user devices;
capturing interaction data associated with the second content item from the first set of user devices; and
sending the second content item to a second set of user devices based at least in part on the interaction data meeting or exceeding a threshold.

17. The system of claim 16, wherein the operations further comprise:
ranking the second content item and a plurality of content items based at least in part on the content centric metric; and
wherein sending the second content item to the first set of user devices is based at least in part on the ranking.

18. The system as recited in claim 16, wherein determining a content centric metric associated with the second content item is responsive to a characteristic of a user account associated with the second content item meeting or exceeding an activity threshold.

19. The system of claim 16, wherein the content centric metric is associated with at least one of:
an expected level of engagement associated with the second content item;
an educational aspect of the second content item; or
a video quality with the second content item.

* * * * *